(No Model.)
J. A. REYNOLDS.
Elevated Scale Beam for Head Blocks.
No. 232,302.  Patented Sept. 14, 1880.
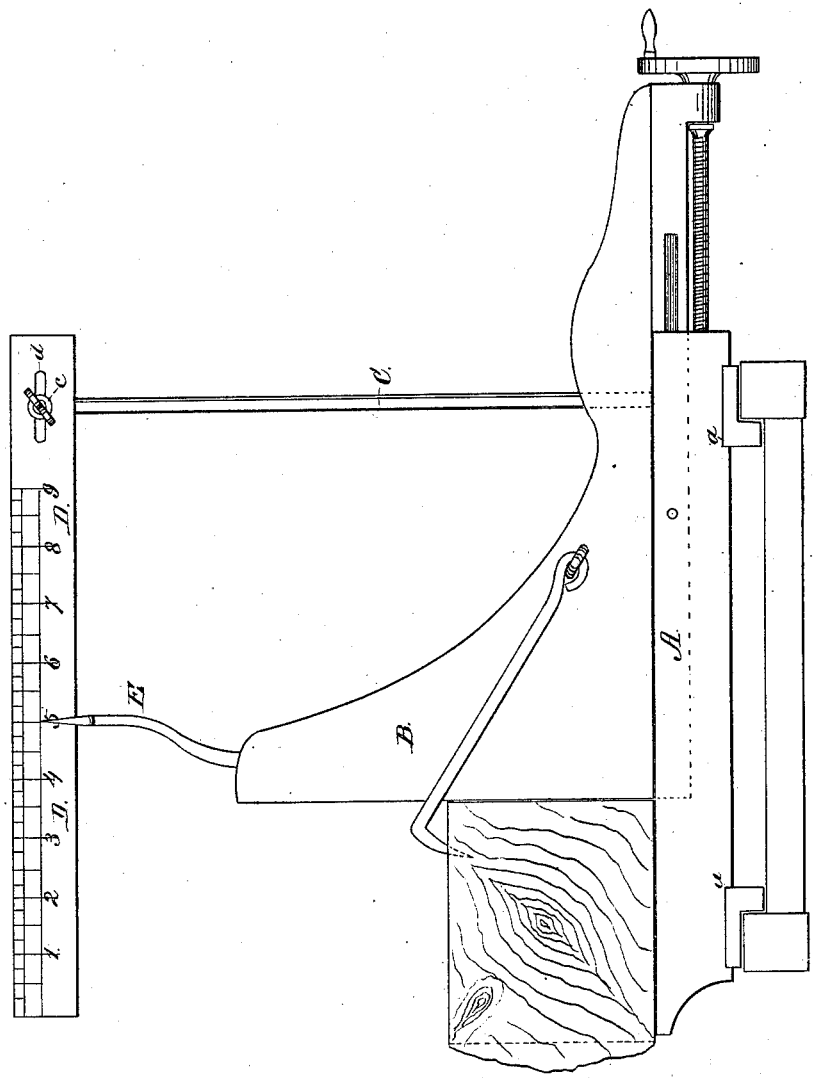
WITNESSES:
W. W. Hollingsworth
Solon C. Kemon
INVENTOR:
Jno. A. Reynolds
BY
ATTORNEYS.
N. PETERS, PHOTO-LITHOGRAPHER, WASHINGTON, D. C.

UNITED STATES PATENT OFFICE.

JOHN A. REYNOLDS, OF DANVILLE, PENNSYLVANIA.

ELEVATED SCALE-BEAM FOR HEAD-BLOCKS.

SPECIFICATION forming part of Letters Patent No. 232,302, dated September 14, 1880.

Application filed April 28, 1880. (No model.)

*To all whom it may concern:*

Be it known that I, JOHN A. REYNOLDS, of Danville, Montour county, Pennsylvania, have invented a new and Improved Elevated Scale-Beam for Saw-Mill Head-Blocks; and I do hereby declare the following to be a full, clear, and exact description of the same.

The object of my invention is to provide the head-block of a saw-mill with an elevated scale-beam that may be at all times plainly visible, and upon which may be boldly marked the scale-measurements, so that the mill-operative may at a glance ascertain the thickness of the log upon the head-block and readily adjust the log relatively to the saw in order to cut from it any required thickness of material, the scale-beam being attached in a peculiar manner to admit of its ready removal and allow of other beams to be substituted therefor, upon which will be graduations to suit boards of different thicknesses; and the improvement consists in securing an upright rod or post to the base or shears of the head-block, to the upper end of which is adjustably attached one end of a scale-beam by means of a slot and clamping-screw, and in securing to the movable knee-plate of the head-block an index-rod, the upper end of which is slotted to receive and form a rest for the unsupported end of the scale-beam, the extreme ends of the rod being pointed to accurately mark its position upon the graduation of the scale, and as the log will at all times rest closely against the face of the knee-plate to which the index-rod is permanently attached, the size of the log may be at all times ascertained.

The accompanying drawing represents a side elevation of a saw-mill head-block with my improvement attached.

The base or shears A of the head-block forms a support and guide for a knee-plate, B, in a well-known manner, and may be connected therewith by suitable mechanism for accurately moving the knee-plate upon the base.

The log to be sawed rests upon the upper face of the shears A, and is securely clamped against the face of the knee-plate B, so that as the knee-plate is moved upon its ways the log will be moved toward the saw a distance exactly corresponding thereto.

The shears A are secured by flanged shoe-plates a to the longitudinal rails of a saw-mill carriage, so that the carriage may be fed forward to the saw and gigged back by any well-known mechanism.

An upright rod, C, is secured at its lower end to the base or shears A, to the upper end of which is adjustably secured one end of a scale-beam, D, by means of a set-screw, c, upon the end of the rod. The set-screw c passes through a slot, d, in the end of the beam D, and securely clamps them together. The scale-beam may thus be adjusted to compensate for shrinkage or accidental dislocation.

To the upper projecting end of the knee-plate B is secured an index-rod, E, the upper extremity of which is slotted or bifurcated, into which bifurcation is supported the forward end of the scale-beam, so that the scale-beam is thus securely held in a horizontal and elevated position.

The end of the index-rod is pointed to accurately indicate its position upon the scale, and as the knee-plate, log, and index-finger are all moved together in feeding the log to the saw, and as the scale-beam is held stationary, it will be seen that the size of the log and the exact thickness of each piece of material cut from it will be accurately indicated.

The size of the scale-beam is not limited, and the graduations and figures may be distinctly marked upon its face in bold characters, to be readily and unmistakably ascertained. The rods that support the scale-beam may be of sufficient length to bring the scale-beam at or about an equal height with the face of the operator, so that the exact position of the index upon the scale may be read by him without stooping or changing his position.

The scale-beam D may be readily removed by unscrewing the set-screw c, and another beam having graduations of a different scale may be substituted. As the scale-beam is supported at one end by the pronged end of the index-rod to slide freely therein, and the other end is secured to a single upright rod by a set-screw passing through a slot in the end of the scale-beam, it is evident that the beam may be readily adjusted to bring the index-finger opposite the graduations, should their proper relative arrangement be at any time disturbed.

I claim as my invention and desire to secure by Letters Patent—

The combination, with a saw-mill head-block, of the scale-beam D, slotted at one end and secured to an upright rod, C, by means of a set-screw, c, and supported at its other end in the forked extremity of an index-rod, substantially as and for the purpose specified.

JOHN A. REYNOLDS.

Witnesses:
T. R. McCLELLAN,
S. C. GOLDEN.